United States Patent

Boville

[11] Patent Number: 5,168,604
[45] Date of Patent: Dec. 8, 1992

[54] TWO-PART FASTENING CLIP

[75] Inventor: Daniel Boville, Paris, France

[73] Assignee: A. Raymond et Cie, Grenoble, France

[21] Appl. No.: 799,290

[22] Filed: Nov. 27, 1991

[30] Foreign Application Priority Data

Nov. 30, 1990 [DE] Fed. Rep. of Germany ....... 4038159

[51] Int. Cl.$^5$ .................................................. A44B 17/00
[52] U.S. Cl. ........................................... 24/297; 24/453
[58] Field of Search .............. 24/297, 453, 563, 573.1; 403/11, 405.1, 407.1; 411/508, 510, 913

[56] References Cited

U.S. PATENT DOCUMENTS

| | | | |
|---|---|---|---|
| 4,393,561 | 7/1983 | Yuda | 24/297 |
| 4,505,611 | 3/1985 | Nagashima et al. | 403/405.1 |
| 4,506,419 | 3/1985 | Mitomi | 24/297 |
| 4,524,494 | 6/1985 | Sato et al. | 24/297 |
| 4,698,882 | 10/1987 | Lang | 24/453 |

FOREIGN PATENT DOCUMENTS

| | | | |
|---|---|---|---|
| 3029845 | 5/1985 | Fed. Rep. of Germany | |
| 0418735 | 2/1967 | Switzerland | 24/297 |

*Primary Examiner*—Victor N. Sakran
*Attorney, Agent, or Firm*—Finnegan, Henderson, Farabow, Garrett & Dunner

[57] ABSTRACT

A two-part fastening clip for fastening a piece of longitudinal extending molding to a panel. The clip includes a bottom part having means for anchoring the bottom part in a hole in the panel and a top part having means for securing the molding to it. The bottom part has an upwardly projecting connection pin of rectangular cross-section and a pair of side pieces projecting laterally outward from two opposite sides of the upper end of the pin. Downwardly facing seat surfaces that extend in a direction perpendicular to the pin and in the longitudinal direction of the molding are provided on the lower sides of the side pieces and two outwardly and downwardly slanting slide surfaces are provided on the other two sides of the upper end of the pin. The top part has a crosshead member and two spaced and downwardly depending side walls, an aperture in the crosshead member for receiving the upper end of the connection pin of the bottom part, and a pair of resilient locking tongues that extend inwardly and upwardly from the lower ends of the side walls of the top part toward said aperture thereby forming a socket in the top part for receiving the upper end of the pin. Then when the top part is pressed down on the pin, the locking tongues will snap behind the laterally projecting side pieces of the pin and engage the seat surfaces to lock the two parts together. The top part also has a projection that presses down on the upper end of the pin when the pin is inserted into the top part to hold the seat surfaces of the pin tightly against the ends of the locking tongues. With this construction, when it is necessary to remove the molding, the top part can be slid in the longitudinal direction of the molding relative to the bottom part, the upper ends of the resilient locking tongues sliding along the seat surfaces until they are free thereof, to separate the top part with the molding secured thereto from the aid bottom part which remains secured to the panel.

4 Claims, 4 Drawing Sheets

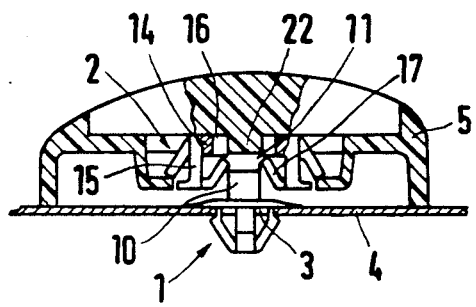
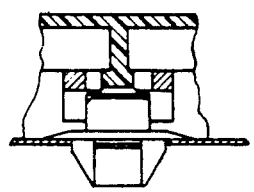
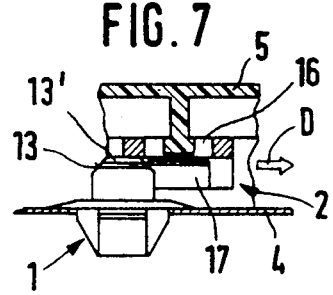
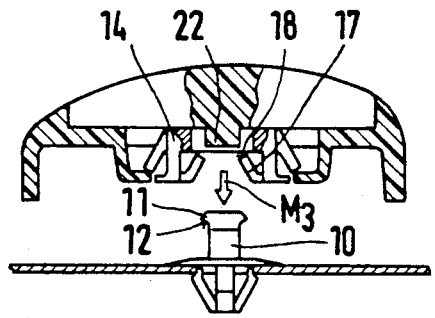
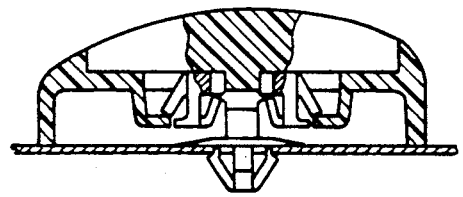

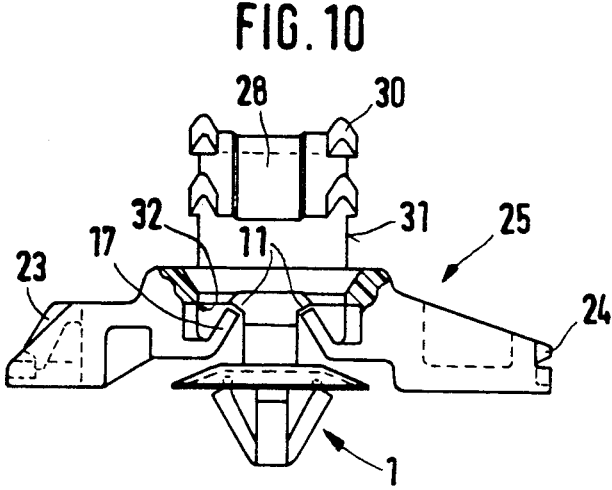
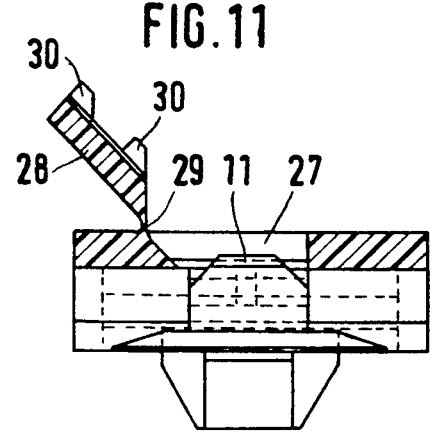
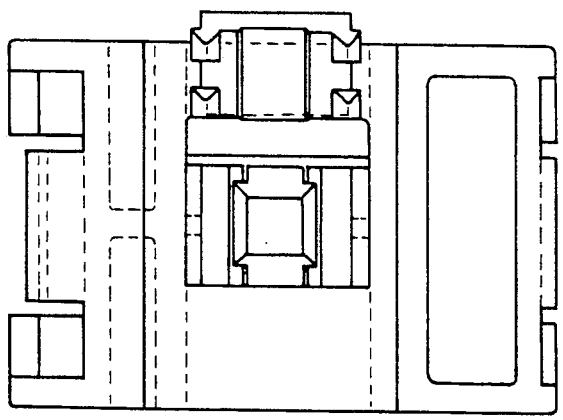
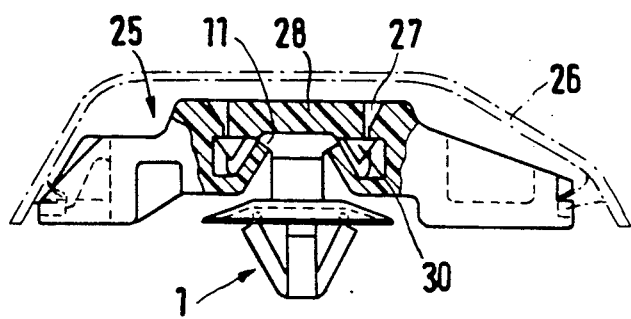
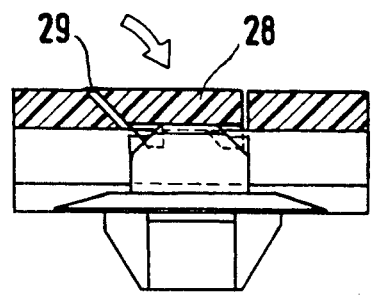

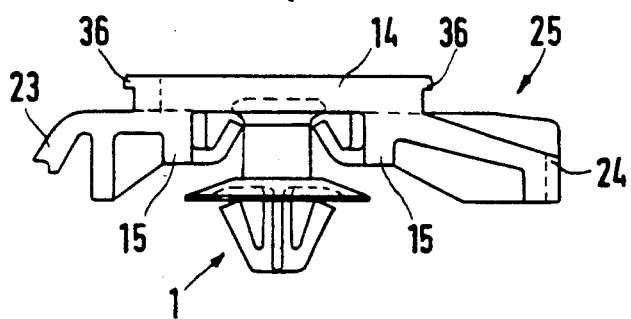
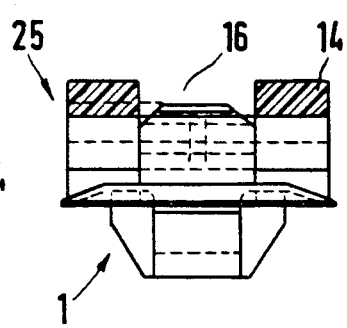
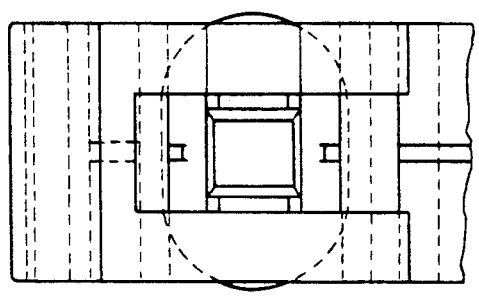
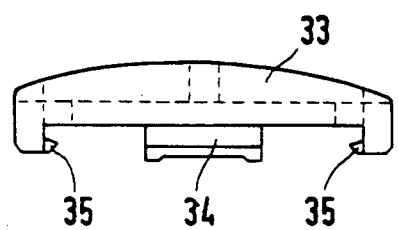
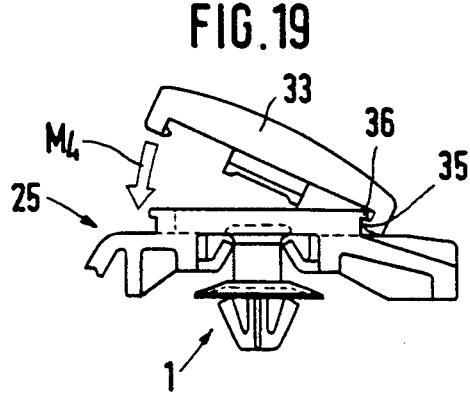
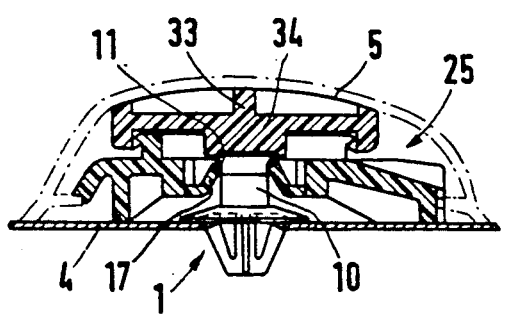

ial view, of a two-art fastening clip;

TWO-PART FASTENING CLIP

BACKGROUND OF THE INVENTION

This invention relates to a two-part fastening clip for fasten or decorative moldings.

A clip of this general type is known for example from German Patent No. 30 29 845 C2. Although the clip shown therein is not specifically intended for fastening protective or decorative moldings, but for mounting a cladding panel on a carrier plate, nevertheless this clip is comparable to such clips because both have a means for fastening a bottom part on a carrier plate and a snap fastener type of connection between the bottom part and a top part.

This two-part fastening clip is usually supplied in the assembled state, the top part being first inserted into position in fastening holes in the decorative molding, so that the bottom part of the clip can be inserted directly into fastening holes in a the carrier plate or support panel and be nondetachably anchored therein. Typically, such clips are used to secure decorative moldings onto a vehicle body or onto the outer panel of a door of the vehicle. If the decorative molding has to subsequently be removed because of damage to it or for other reasons, the parts can be separated by appropriate application of force causing elastic expansion of the snap fastening means, or they can be levered apart with the aid of a suitable tool.

In such cases, although the bottom parts remain in their anchorages and can even be reused when a new decorative molding is fitted thereto, nevertheless the decorative molding, if it was not already damaged, is affected by this forcible removal to such an extent that it is sometimes necessary to replace it with a new decorative molding. Further, when a removal tool is used, it may cause dents in the bodywork, so that after a decorative molding has been replaced it may all be necessary to remove marks on the bodywork.

An object of the invention therefore is to construct such a fastening clip in such a way that, in addition to simple mounting, it can also enjoy problem-free removal without damage to either the decorative molding or the bodywork panel to which it is fastened thereby allowing any removed parts to be readily reused.

SUMMARY OF THE INVENTION

This object is achieved according to the present invention by providing a two-part fastening clip for fastening a piece of longitudinally extending molding to a panel comprising a bottom part having means for anchoring the bottom part in a hole in said panel and a top part having means for securing said molding thereto, said bottom part having an upwardly projecting connection pin have an upper end and four sides forming a rectangular cross-section thereto, a pair of side pieces projecting laterally outward from two opposite sides of the upper end of the pin, said side pieces having downwardly facing seat surfaces that extend in a direction perpendicular to the pin and in the longitudinal direction of the molding and two outwardly and downwardly slanting slide surfaces on the other two sides of the upper end of the pin that extend downwardly below the level of the seat surfaces, said top part having a crosshead member and two spaced and downwardly depending side walls to form a U-shaped cross-section, an aperture in the crosshead member for receiving the upper end of the connection pin of the bottom part, a pair of resilient locking tongues extending inwardly and upwardly from the lower ends of the side walls of the top part toward said aperture and ending near said crosshead member thereby forming a socket in the top part for receiving the upper end of the pin, whereby when the top part is pressed down on the pin of the bottom part, the locking tongues will snap behind the laterally projecting side pieces of the pin and lie adjacent said seat surfaces, said top part with a piece of molding secured thereto having a surface that engages the upper end of the pin when the pin is inserted into the top part to hold the seat surfaces of the pin tightly against the ends of the locking tongues, whereby the top part can be slid in the longitudinal direction of the molding relative to the bottom part, the upper ends of the resilient locking tongues sliding along said seat surfaces, to separate said top part with the molding secured thereto from said bottom part secured to said panel.

By virtue of this construction, it is now possible for the decorative molding, which will have already been mounted on a body panel, to be removed by lateral displacement without damage to the paintwork, the top parts of the clips remaining in the decorative molding while the bottom parts remain fastened to the panel. If the molding has not been damaged by the action of other external forces, it can be readily remounted to the panel simply by snapping the top parts back onto the bottom parts.

BRIEF DESCRIPTION OF THE DRAWINGS

Exemplary embodiments of the invention are illustrated in the drawings and will be explained in greater detail below. Of the drawings:

FIG. 5 shows the decorative molding and the fastening clip mounted on the body panel;

FIG. 6 is a partial longitudinal sectional view of the mounted decorative molding of FIG. 5, with the bottom part of the clip in side view;

FIG. 7 is the same longitudinal sectional view as in FIG. 6, but with the decorative molding pulled out sideways from the bottom part of the clip;

FIG. 8 shows the decorative molding with the top part attached thereto separated from the bottom part of the fastening clip which remains in the body panel and before being remounted thereon;

FIG. 9 shows the decorative molding remounted on the bottom part of the fastening clip;

FIG. 10 shows another embodiment, in front elevational view, of a fastening clip with a pivotable cover;

FIG. 11 is a side view of the fastening clip of FIG. 10, with the top part in section;

FIG. 12 is a plan view of the fastening clip of FIG. 10;

FIG. 13 is a partial sectional view of the fastening clip of FIG. 10 with the cover pivoted into position and with an attached decorative molding in dot-dash lines;

FIG. 14 is a side view of the closed fastening clip of FIG. 13, with a section through the top part;

FIG. 15 shows another embodiment, in front elevational view, of a two-art fastening clip;

FIG. 16 is a side view of the fastening clip of FIG. 15, with the top part in section;

FIG. 17 is a plan view of the fastening clip of FIG. 15;

FIG. 18 shows a cover for the clip;

FIG. 19 shows the fastening clip of FIG. 15 with the cover being pivoted into position; and FIG. 20 shows the fastening clip with the cover pivoted into position, the clip mounted to a body panel and the decorative molding attached thereto in dot-dash lines.

DETAILED DESCRIPTION OF THE INVENTION

Figure 1:
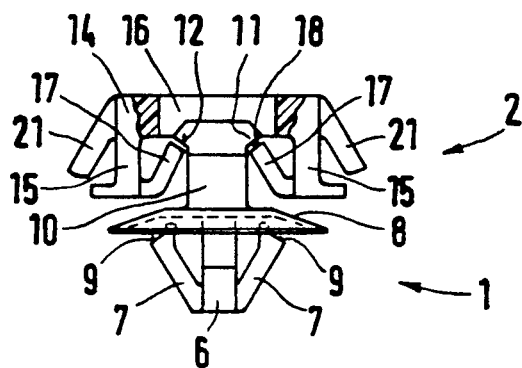
FIG. 1 is a front elevational view of a two-part fastening clip of the invention.
Figure 2:
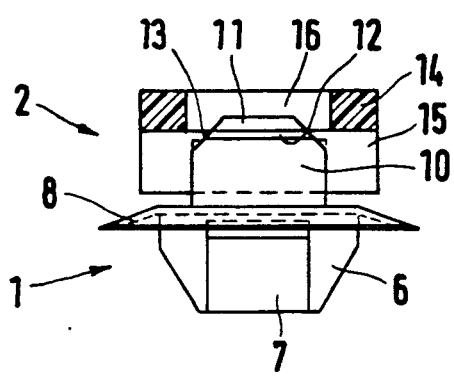
FIG. 2 is a side view of the same fastening clip with the top part in section.
Figure 3:
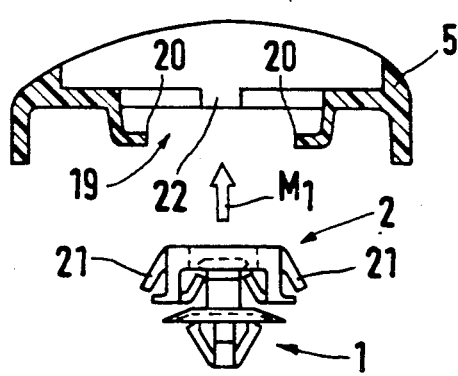
FIG. 3 shows the fastening clip with a decorative molding to be attached shown in cross-section.
Figure 4:
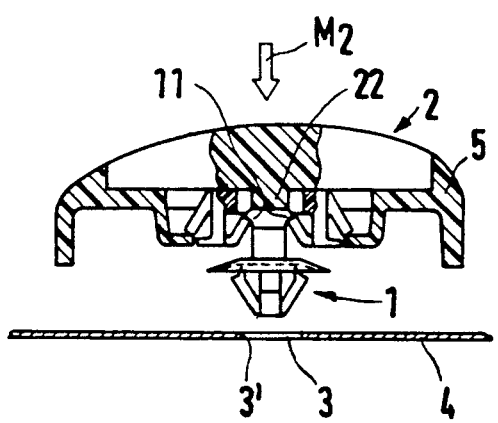
FIG. 4 shows the decorative molding attached to the fastening clip, but before mounting it on a body panel.

The fastening clip shown in FIGS. 1 to 9 is made of a hard-elastic plastic material and serves to fasten protective or decorative moldings to the body walls or panels of motor vehicles. The clip consists essentially of a bottom part 1 having means for anchoring it in a hole 3 in the bodywork panel 4, and a top part 2 having means for securing a decorative molding 5 thereto and which can be readily connected to the bottom part 1 in the manner of a snap fastener.

As the means for anchoring the clip in the bodywork panel 4, the bottom part 1 is provided with a stem 6 which can be inserted into fastening hole 3 and has a rectangular cross-section. On the bottom part of the stem are formed two expanding tongues 7 that extend upwards in a V-shape and are positioned to engage against the rim 3' of the hole 3, while a seal shield 8 on the top part of the stem covers the top of the fastening hole 3 in the panel 4.

When the stem 6 is pressed into the hole 3, the expanding tongues 7 first yield inwardly and when they have passed the rim 3' of the hole they spring back into their original position, the top edges 9 of the expanding tongues 7 then lying against the underside of plate 4 adjacent the rim 3' of the hole, while at same time the seal shield 8 is elastically pressed slightly flat against the top of the plate, thereby producing a counterpressure to provide a secure anchoring. (See FIG. 5).

A connection pin 10, likewise of rectangular cross-section, extends upwardly from seal shield 8, and has a pair of support side pieces 11 that project laterally outward from two opposite sides of the upper end of the pin. The side pieces each have beveled top edges and downwardly directed seat surfaces 12 formed on the lower longitudinal sides thereof, which surfaces extend in the axial direction of the decorative molding 5, i.e., perpendicular to the axis of the bottom part. See FIG. 2.

In addition, connection pin 10 is provided on its other two sides with outwardly and downwardly slanting (i.e., roof-shaped) slide surfaces 13, that extend from the top of the pin downward below the level of the seat surfaces 12.

Top part 2 consists of a main body of generally U-shaped cross-section, comprising a crosshead member 14 at the top and two side walls 15 extending downwardly therefrom toward bottom part 1. A rectangular aperture or cutout 16, matching the contour of connection pin 10 and its support side pieces 11, is formed in crosshead member 14, while at the bottom end of the two side walls 15 are located resilient locking or support tongues 17 that project obliquely inwardly and are able to open elastically outwardly. Tongues 17 end with their top edges 18 close beneath crosshead member 14 and extend parallel to the axial direction of the decorative molding 5.

As the means for holding the molding thereto, top part 2 has two legs 21 extending downwardly and outwardly from opposite sides of cross member 14. Further, the decorative molding 5 shown in FIGS. 3 to 9 has on its underside a recess 19 having two lateral catch edges 20 that cooperate with the two expanding legs 21 formed on crosshead member 14 of the top part 2, so that when top part 2 is pressed in the direction of the arrow M1 in FIG. 3, expanding legs 21 will firmly anchor behind the catch edges 20 of molding 5.

Inside recess 19 is a downwardly extending projection 22 formed integral with decorative molding 5. This projection fits into the cutout 16 of the top part 2 when it is pressed into recess 19, and will press the seat surfaces 12 of the laterally projecting support side pieces 11 against the support edges 18 of the support tongues 17. See FIG. 4.

By then pressing decorative molding 5 in the direction of the arrow M2 (FIG. 4), the fastening clips now inserted accurately in position on the molding, the molding can then be anchored to the fastening holes 3 in the bodywork panel 4 (FIG. 5).

As can be seen in FIGS. 6 and 7, the decorative molding 5 can, if necessary, be detached from the panel by sliding it sideways in the direction of the arrow "D". As the support tongues 17 yield elastically, top part 2 thus over the top of connection pin 10 until the top edges 18 of the support tongues 17 have passed out from under the seat surfaces 12 of the support side pieces 11. The decorative molding 5, together with the top parts 2 of the fastening clips attached, can then be removed from the bodywork panel, while the bottom parts 1 remain anchored in the holes 3 in the bodywork panel 4.

As can be seen in FIG. 8, to remount the decorative molding 5, all that is necessary is to press the latter, together with the retained top parts 2, back into the bottom parts 1 in the direction of the arrow M3 against the bodywork panel 4, the support tongues 17 of the top parts 2 yielding elastically as they slide past the bevelled top edges of the support side pieces 11. As soon as the upper edges 18 of tongues 17 have passed the outer edges of side pieces 11, the support tongues 17 spring back to their original position, so that edges 18 again engage flush with the seat surfaces 12 of the support side pieces 11 (FIGS. 5 and 9). For this purpose, seat surfaces 12 and support edges 18 are so aligned that the former form a right angle with support tongues 17.

The fastening clip illustrated in FIGS. 10 to 14 is in principle of exactly the same construction as the fastening clip already described, the fastening members 23 and 24 on the top part 25 being of a slightly modified shape to match the shape of the decorative molding 26.

The essential difference consists in that on the top transverse rim of the cutout 27 of the top part 25, a cover 28 is formed having a film hinge 29 that can be pivoted into the cutout 27 in order to press the support side pieces 11 onto the support tongues 17. Cover 28 is provided on its longitudinal edges 31 with locking means, such as laterally projecting catches 30, which engage behind a longitudinal rim 32 on the bottom of cutout 27 when cover 28 is pivoted into position (see FIGS. 13 and 14). Cover 28 thus takes the place of projection 22 on the molding in the first embodiment.

FIGS. 15 to 18 show another embodiment of the two-part fastening clip, which, instead of the pivotable cover 28 used in the previously described embodiment, has a separate cover 33 (FIG. 18). At the center of this cover 33 is a projection 34 matching the cutout 16 and it is provided with catches 35 on two opposite sides. On the crosshead member 14 of the top part 25 are provided catch edges 36 corresponding to catches 35 that extend in the axial direction of the decorative molding 5 for holding the cover in place.

As shown in FIG. 19, the catches 35 on one side of the cover 33 are first placed under a catch edge 36 and then the other side is pivoted downwards in the direction of the arrow M4 until the catches 35 on the other side engage under the opposite catch edge 36. Projection 34 then presses from above on the connection pin 10, so that the support side pieces 11 of the bottom part 1 lie flush against the support tongues 17 of the top part 25 (FIG. 20).

What is claimed:

1. A two-part fastening clip for fastening a piece of longitudinal extending molding to a panel comprising a bottom part having means for anchoring the bottom part in a hole in said panel and a top part having means for securing said molding thereto, said bottom part having an upwardly projecting connection pin having an upper end and four sides forming a rectangular cross-section thereto, a pair of side pieces projecting laterally outward from two opposite sides of the upper end of the pin, said side pieces having downwardly facing seat surfaces that extend in a direction perpendicular to the pin and in the longitudinal direction of the molding and two outwardly and downwardly slanting slide surfaces on the other two sides of the upper end of the pin that extend downwardly below the level of the seat surfaces, said top part having a crosshead member and two spaced and downwardly depending side walls to form a U-shaped cross-section, an aperture in the crosshead member for receiving the upper end of the connection pin of the bottom part, a pair of resilient locking tongues extending inwardly and upwardly from the lower ends of the side walls of the top part toward said aperture and ending near said crosshead member thereby forming a socket in the top part for receiving the upper end of the pin whereby when the top part of the clip is pressed down on the pin of the bottom part, the locking tongues will snap behind the laterally projecting side pieces of the pin and lie adjacent said seat surfaces, said top part with a piece of molding secured thereto having a surface that engages the upper end of the pin when the pin is inserted into the top part to hold the seat surfaces of the pin tightly against the ends of the locking tongues, whereby the top part can be slid in the longitudinal direction of the molding relative to the bottom part, the upper ends of the resilient locking tongues sliding along said seat surfaces, to separate said top part with the molding secured thereto from said bottom part secured to said panel.

2. The fastening clip of claim 1, wherein the molding has a projection formed therein that extends down into the aperture of the crosshead member of the top part when it is secured to said top part, the projection having said surface as its lower end that engages with the upper end of said pin when it is inserted into said top part.

3. The fastening clip of claim 1, including a cover hinged to said crosshead member adapted to be pressed into said aperture and means for locking it in place, the lower side of said cover providing said surface that engages with the upper end of said pin when it is inserted into said top part.

4. The fastening clip of claim 1, wherein the seat surfaces are perpendicular to the support tongues.

* * * * *